United States Patent
Barth et al.

(10) Patent No.: US 8,967,101 B2
(45) Date of Patent: Mar. 3, 2015

(54) TWO-STROKE ENGINE AND A METHOD FOR THE OPERATION THEREOF

(75) Inventors: Christian Barth, Leutenbach-Nellermsbach (DE); Johannes Menzel, Wernau/Neckar (DE); Marc Schmid, Oppenweiler (DE); Jens-Helge Kutzbach, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 115 days.

(21) Appl. No.: 13/603,635

(22) Filed: Sep. 5, 2012

(65) Prior Publication Data
US 2013/0061835 A1 Mar. 14, 2013

(30) Foreign Application Priority Data

Sep. 9, 2011 (DE) .......................... 10 2011 113 082

(51) Int. Cl.
*F02B 33/04* (2006.01)
*F02B 33/00* (2006.01)
*F02B 25/00* (2006.01)

(52) U.S. Cl.
CPC .............. *F02B 33/04* (2013.01); *Y02T 10/146* (2013.01)
USPC .................. 123/73 DA; 123/73 S; 123/73 PP; 123/73 V (58) Field of Classification Search
CPC .................... F02B 2075/025; F02B 2720/131; F02B 75/34; F02B 33/04; F02B 25/22; F02B 25/14; F02B 25/00; F02B 33/00; F02B 33/30; F01L 7/12; F02F 1/22
USPC ................................ 123/73 DA, 73 PP, 73 S
See application file for complete search history.

(56) References Cited

U.S. PATENT DOCUMENTS

| | | | | |
|---|---|---|---|---|
| 666,264 | A * | 1/1901 | Denison ...................... | 123/73 D |
| 7,093,570 | B2 * | 8/2006 | Mavinahally et al. ...... | 123/73 D |
| 7,469,666 | B2 * | 12/2008 | Martinsson et al. ...... | 123/73 PP |
| 7,975,660 | B2 * | 7/2011 | Mavinahally et al. ...... | 123/73 D |
| 2002/0134326 | A1 | 9/2002 | Araki | |
| 2011/0146642 | A1 * | 6/2011 | Geyer et al. ............... | 123/73 PP |

FOREIGN PATENT DOCUMENTS

DE 101 50 322 A1 4/2003

* cited by examiner

*Primary Examiner* — Lindsay Low
*Assistant Examiner* — Syed O Hasan
(74) *Attorney, Agent, or Firm* — Walter Ottesen P.A.

(57) ABSTRACT

A two-stroke engine has a cylinder wherein a piston is journalled for reciprocating movement. The piston delimits a combustion chamber configured in the cylinder. The engine has an outlet from the combustion chamber and a transfer channel which opens at an inlet opening into the crankcase and at a transfer window in the combustion chamber. The piston drives a crankshaft via a connecting rod. The crankshaft is rotatably journalled in the crankcase. At least one control element for the inlet opening is connected to the crankshaft so as to rotate therewith. The control element is so arranged that the inlet opening is at least partially closed thereby in at least one operating state of the engine during the downward stroke of the piston at least 5° crankshaft angle after the opening of the transfer window.

16 Claims, 5 Drawing Sheets

TWO-STROKE ENGINE AND A METHOD FOR THE OPERATION THEREOF

CROSS REFERENCE TO RELATED APPLICATION

This application claims priority of German patent application no. 10 2011 113 082.2, filed Sep. 9, 2011, the entire content of which is incorporated herein by reference.

BACKGROUND OF THE INVENTION

A two-stroke engine, in which the inlet opening of the transfer channel into the crankcase is controlled by a control element which is connected to the crankshaft in a rotatably fixed manner, is, for example, disclosed in DE 101 50 322 A1. From, for example, United States patent application publication 2002/0134326, it is also known to control the inlet opening of the transfer channel into the crankcase by way of the piston skirt. In known two-stroke engines, the control of the inlet opening of the transfer channel is executed in such a manner that the inlet opening is open when the transfer window is also open. In United States patent application publication 2002/0134326, the opening of the inlet opening into the crankcase is delayed in relation to the opening of the transfer window into the combustion chamber, so that exhaust gas is pre-stored in the transfer channels.

It has been shown that, in the case of two-stroke engines, in the higher rotational speed range or while operating with a cold engine, a combustion pattern can arise in which very high pressures develop which can lead to wear on components. Further disadvantages of the arising combustion pattern are reduced power, an unstable maximum rotational speed and a high noise level.

SUMMARY OF THE INVENTION

It is an object of the invention to provide a two-stroke engine of the above type, with which a disadvantageous combustion pattern can be avoided. It is a further object of the invention to provide a method for the operation of a two-stroke engine which avoids a disadvantageous combustion pattern.

The two-stroke engine of the invention includes: a crankcase; a cylinder connected to the crankcase; a piston disposed in the cylinder so as to reciprocate back and forth therein; the piston delimiting a combustion chamber in the cylinder; the cylinder having an outlet leading from the combustion chamber; at least one transfer channel having an inlet opening whereat the transfer channel opens into the crankcase and a transfer window whereat the transfer channel opens into the combustion chamber with the transfer window being opened and closed by the piston during operation of the engine; a crankshaft rotatably journalled in the crankcase; a connecting rod connecting the piston to the crankshaft so as to permit the piston to drive the crankshaft via the connecting rod; a control element for closing and opening the inlet opening and the control element being connected to the crankshaft so as to rotate therewith; and, the control element being mounted on the crankshaft so as to cause the inlet opening to be at least partially closed thereby at the latest at 5° crankshaft angle after opening of the transfer window during a downward stroke of the piston in at least one operating state of the engine.

It has been shown that the cause for the undesired combustion pattern is a pushing back of exhaust gases into the crankcase. This pushing back of exhaust gas occurs as soon as the transfer windows open and was primarily observed in engines in which the time period between the opening of the outlet and the opening of the transfer windows is very short. In order to avoid this pushing back, it is provided for a two-stroke engine that a control element for the inlet opening is arranged in such a manner that the inlet opening is at least partially closed by the control element during the downward stroke of the piston at the latest at a crankshaft angle of 5° after the opening of the transfer window. The at least partial closing of the inlet opening at the latest shortly after the transfer window has opened prevents the exhaust gases from being able to be pushed back from the combustion chamber into the crankcase. The exhaust gases escape through the outlet on account of the closed transfer channels with respect to the crankcase, and the combustion pressure in the cylinder can be relieved via the outlet. As a result of the closing of the inlet opening into the crankcase, it can be avoided that the pressure in the crankcase increases greatly in an undesired manner because of the exhaust gas pushed back into the crankcase. As a result, during the subsequent upward stroke of the piston, a sufficient amount of mixture is drawn into the crankcase, the mixture being available for the next combustion in the combustion chamber. As a result, a uniform combustion pattern can be achieved and undesired high pressures in the crankcase can be avoided.

The control element can be active in all operating states of the two-stroke engine, for example at all rotational speeds. It can, however, also be provided that the control element is active only in one or more particular operating states. The control element is active in particular in an operating state in which a disadvantageous combustion pattern can occur. An operating state can, for example, be dependent on the temperature of the engine or dependent on the rotational speed. Other parameters for determining an operating state can also be advantageous.

Advantageously, the crankshaft includes at least one crankweb and the control element is at least partially arranged at the front end of the crankweb. It can, however, also be provided that the control element is arranged at least partially on the periphery of the crankshaft.

The connecting rod is mounted eccentrically on the crankshaft. During operation, the connecting rod revolves in a movement region which extends as far as directly adjacent to the peripheral wall of the crankcase. It is provided that the inlet opening extends up into the peripheral region of the crankcase which delimits the movement region of the connecting rod. This is advantageous in particular for transfer channels which open into the crankcase by way of a single common inlet opening. In this case, the transfer channels are brought together from opposite sides of the cylinder to a common inlet opening. Advantageously, two crankwebs are provided and a control element is arranged on each thereof, the connecting rod being arranged between the crankwebs. There must be sufficient space between the control elements in the direction of the rotational axis of the crankshaft so that the connecting rod can be moved though between the control elements without contact. In order nonetheless to be able to largely close the inlet opening, it is provided that a strut or web is arranged on the crankcase, which is arranged adjacent to the movement region of the connecting rod and partially covers the inlet opening. Advantageously, the strut has a reflection contour which is configured concavely toward the transfer channel. As a result, a flowing over of exhaust gases into the crankcase can be avoided without excessive impermeability requirements between the strut and the control elements having to be met. The pressure wave caused by the exhaust gas in the transfer channel is reflected at the reflection contour and does not propagate into the crankcase.

Advantageously, the control element is adjustable between an active and an inactive position. The control element is in this case only effective in the active position. As a result, the control element acts in the operating states in which a disadvantageous combustion pattern can arise and is in the inactive position during other operating states. As a result, the flowing in of exhaust gases into the transfer channel can be allowed or avoided depending on the operating state. Advantageously, the control element is adjusted between the active and the inactive position depending on the rotational speed of the two-stroke engine. As a result, automatic adjustment between the inactive and the active positions of the control element is achieved in a simple manner. Advantageously, the control element is in the active position at rotational speeds above a nominal rotational speed of the two-stroke engine and is in the inactive position at rotational speeds at or below the nominal rotational speed. As a result, the control element is only effective in the upper rotational speed region in which the danger of high noise levels exists because of disadvantageous combustion patterns.

For a method for operating a two-stroke engine, it is provided that the inlet opening is at least partially closed by the control element during the downward stroke of the piston in at least one operating state of the two-stroke engine at the latest at a crankshaft angle of 5° after the opening of the transfer window. As a result, exhaust gas flowing from the combustion chamber into the crankcase can be avoided. In this case, it can be advantageous for the inlet opening to be closed only shortly after the opening of the transfer window so that exhaust gases are pre-stored in the transfer channels without a significant amount of the exhaust gases being able to flow into the crankcase from the combustion chamber. As a result, the exhaust gas values can be improved. It can, however, also be provided that the inlet opening is already closed before the opening of the transfer window. The inlet opening is in this case advantageously closed by the control element over its entire flow cross-section.

It is provided for the inlet opening to be opened completely only very late, namely at the earliest at approximately 30°, in particular approximately 25°, advantageously approximately 10° before the bottom dead center of the piston. In particular, the inlet opening is completely opened only after the bottom dead center of the piston. A flowing over of mixture from the crankcase into the combustion chamber thus occurs only during the upward stroke of the piston and not, as in known two-stroke engines, already during the downward stroke. As a result, a uniform combustion pattern of the two-stroke engine can be ensured. Good power control at the final rotational speed of the combustion engine, in particular an early limiting of the combustion engine, is enabled. Advantageously, the inlet opening is completely opened at the latest at a crankshaft angle of 30°, in particular 20°, advantageously 10° after the bottom dead center. As a result, a sufficient amount of time for the flowing over of mixture into the combustion chamber is ensured.

Advantageously, at least one transfer channel near the outlet and one transfer channel remote from the outlet are provided, the inlet opening of the transfer channel near the outlet being opened after the inlet opening of the transfer channel remote from the outlet during the downward stroke of the piston. Because the transfer channel remote from the outlet is opened first and only then is the transfer channel near the outlet opened, good combustion chamber flushing can be achieved and the transfer of fresh mixture directly into the outlet can for the most part be avoided.

The closing of the inlet opening is particularly advantageous in short stroke two-stroke engines, in particular in two-stroke engines in which the transfer window is opened less than a crankshaft angle of approximately 30° after the opening of the outlet. The closing of the inlet opening is particularly advantageous in two-stroke engines in which the transfer window is opened less than a crankshaft angle of approximately 20° after the opening of the outlet.

The control element is, in particular, switched from the inactive position to the active position depending on the rotational speed of the two-stroke engine. The control element is in this case advantageously switched from the inactive position into the active position when a switching rotational speed is exceeded. As a result, the control element is effective only above the switching rotational speed. The switching rotational speed is in this case advantageously selected in such a manner that disadvantageous combustion patterns in the combustion chamber as a result of exhaust gases flowing into the crankcase can only occur above the switching rotational speed. The switching rotational speed is advantageously above a nominal rotational speed of the two-stroke engine. The nominal rotational speed of the two-stroke engine is the rotational speed at which the two-stroke engine has the greatest power. The switching from the inactive position into the active position can in this case occur slowly so that the switching rotational speed provides a rotational speed range in which the control element moves from the inactive position to the active position and partially closes the inlet opening.

BRIEF DESCRIPTION OF THE DRAWINGS

The invention will now be described with reference to the drawings wherein:

FIG. 8 shows a schematic section view of an exemplary embodiment of a two-stroke engine with a control element in the inactive position;

FIG. 9 shows an enlarged view of the control element of the two-stroke engine from FIG. 8; and, FIG. 10 shows the two-stroke engine from FIG. 8 with the control element in the active position.

DESCRIPTION OF THE PREFERRED
EMBODIMENTS OF THE INVENTION

Figure 1:
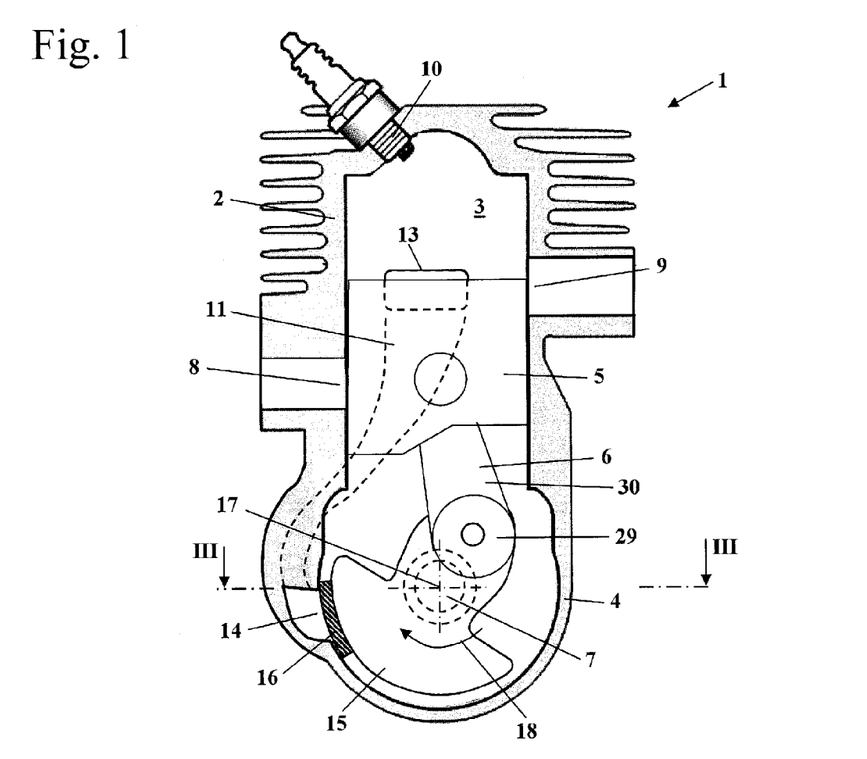
FIG. 1 shows a schematic section view of a two-stroke engine.

FIG. 1 shows a two-stroke engine 1 which is configured as a single cylinder engine and, for example, functions as a drive motor in a hand-held work apparatus such as a motor-driven chain saw, a brushcutter, cutoff machine or the like. The two-stroke engine 1 has a cylinder 2 in which a combustion chamber 3 is formed. The combustion chamber 3 is delimited by a piston 5 mounted in a reciprocating manner in the cylinder 2. The piston 5 drives, via a connecting rod 6, a crankshaft 7 rotatably mounted in a crankcase 4. The crankshaft 7 is mounted rotatably about a rotational axis 17 and rotates in a rotational direction 18 during operation. At the cylinder 2, an inlet 8, which is controlled by the piston 5, opens into the crankcase 4. An outlet 9 which is likewise slot-controlled by the piston 5 leads out of the combustion chamber 3. A spark plug 10 projects into the combustion chamber 3.

The two-stroke engine 1 has transfer channels of which one transfer channel 11 is shown in FIG. 1. The transfer channel 11 opens into the combustion chamber 3 via a transfer window 13 which is slot-controlled by the piston 5. The transfer channel 11 opens into the crankcase 4 by way of an inlet opening 14. The inlet opening 14 is arranged below the outlet 9 and at the periphery of the crankcase 4. The crankshaft 7 includes a crankweb 15 on which a control element 16 is arranged. The control element 16 controls the connection of the inlet opening 14 to the interior space of the crankcase. In the exemplary embodiment, the control element 16 is connected to the crankshaft 7 so as to rotate therewith. However, it can also be provided for the control element 16 to be movable relative to the crankshaft 7, for example in an effective direction of the centrifugal force. The control element 16 can shift the control times of the inlet opening 14, for example depending on the rotational speed, or can switch the closing of the inlet opening 14 on and off depending on the rotational speed so that control of the inlet opening 14 by the control element 16 takes place only in predefined rotational speed ranges.

FIG. 1 shows the piston 5 shortly ahead of bottom dead center. The outlet 9 and the transfer window 13 are partially open. In this position of the piston 5, the inlet opening 14 is completely closed by control element 16. The flow cross section of the inlet opening 14 is completely covered by the control element 16. However, the control element 16 does not seal the inlet opening 14; instead, the control element lies ahead of the inlet opening 14 without touching the peripheral wall of the crankcase 4.

Figure 2:
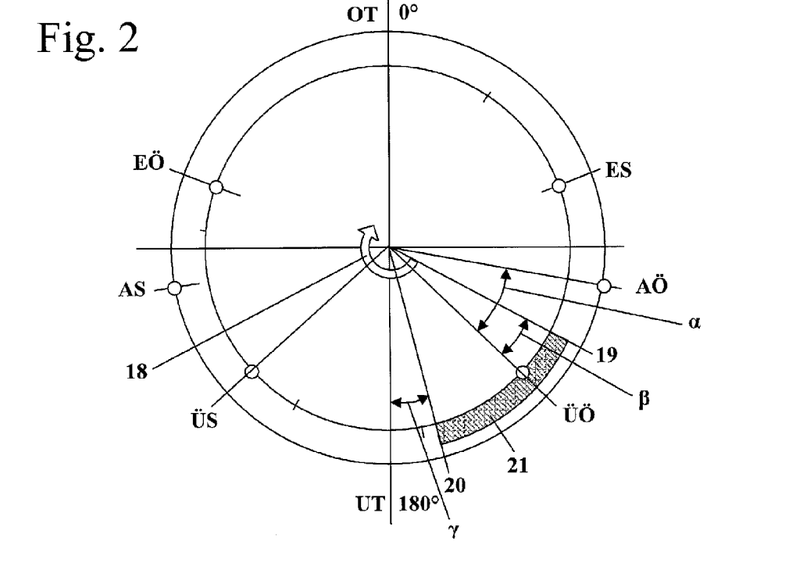
FIG. 2 shows a diagram which shows the control times of the two-stroke engine.

FIG. 2 shows the control times of the two-stroke engine 1. During the downward stroke of the piston 5 from top dead center OT, first the inlet 8 closes at time point ES. During the further downward stroke of the piston 5, the outlet 9 begins to open at time point AÖ. The transfer window 13 begins to open during the further downward stroke of the piston 5. The transfer window 13 begins to open at time point ÜÖ which lies at a crankshaft angle ($\gamma$) later than time point AÖ. The crankshaft angle ($\alpha$) is advantageously less than approximately 30°, especially less than approximately 20°. A first time point 19 at which the control element 16 begins to close the inlet opening 14 lies between the opening of the outlet 9 and the opening of the transfer window 13. The first time point 19 can also lie slightly after the time point ÜÖ and at most approximately at a crankshaft angle of 5°. In the exemplary embodiment, the first time point 19 lies at a crankshaft angle ($\beta$) ahead of the opening of the transfer window ÜÖ, the angle ($\beta$) being approximately 11°.

A second time point 20 at which the control element 16 has again completely opened the inlet opening 14 lies ahead of bottom dead center of the piston 5. The second time point 20 lies at a crankshaft angle ($\gamma$) ahead of bottom dead center which, in the exemplary embodiment, is approximately 20°. The second time point 20 lies at the earliest approximately 30°, especially approximately 20° and preferably approximately 10° ahead of bottom dead center of the piston 5.

During the upward stroke of the piston 5, the transfer window 13 is first closed at the time point ÜS and subsequently the outlet 9 is closed at the time point AS. At the time point EÖ, the inlet 8 is opened by the piston 5. As FIG. 2 shows, all time points which are controlled by the piston lie symmetrically to the line connecting top dead center and bottom dead center. Only the hatched region 21, which characterizes the closing of the inlet opening 14 by the control element 16, is located asymmetrically. The inlet opening 14 is closed essentially during the downward stroke of the piston 5 and is opened during the upward stroke of the piston 5. This asymmetrical control time of the inlet opening 14 is possible because the control element 16 is connected to the crankshaft 7 so as to rotate therewith and the control does not take place via the piston 5.

Figure 3:
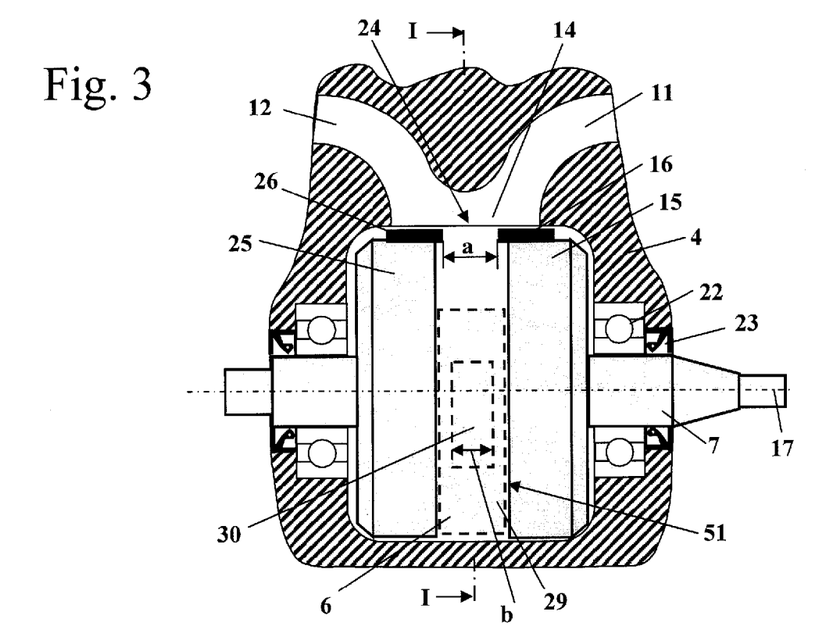
FIG. 3 shows a schematic section along the line in FIG. 1.

FIG. 3 shows the configuration in the crankcase 4 in detail. The crankshaft 7 has two crankwebs 15 and 25 which are arranged symmetrically to the section plane of FIG. 1. Furthermore, two transfer channels 11 and 12 are provided which are likewise arranged symmetrically to the section plane of FIG. 1 and which open at the common inlet opening 14. The inlet opening 14 extends over a large part of the width of the crankcase measured in the direction of the rotational axis 17 of the crankshaft 7.

The crankshaft 7 is mounted by way of crankshaft bearings 22 which are sealed to the outside with seals 23. The connecting rod 6 is arranged between the crankwebs 15 and 25. As also shown in FIG. 1, the connecting rod 6 has a lower crankshaft eye 29 which is arranged between the crankwebs 15 and 25, and also a connecting strut 30 which projects toward the piston 5. The connecting strut 30 has a width (b) which is measured parallel to the rotational axis 17 of the crankshaft 7. The control element 16 is arranged on the crankweb 15 and a control element 26 is arranged on the crankweb 25. The two control elements 16 and 26 are at a distance (a) which is measured in the direction of rotational axis 17, the distance (a) being somewhat greater than the width (b) of the connecting strut 30 so that the connecting strut 30 can move through between the control elements 16 and 26. The connecting rod 6 moves in a movement region 51 in the crankcase 4. The inlet opening 14 extends both at the periphery of the crankwebs (15, 25) and at the periphery of the movement region 51. No control element (16, 26) is arranged in this middle region 24 of the inlet opening 14, and so, in this region, exhaust gases from the combustion chamber 3 can flow into the crankcase 4 during the downward stroke of the piston 5.

Figure 4:
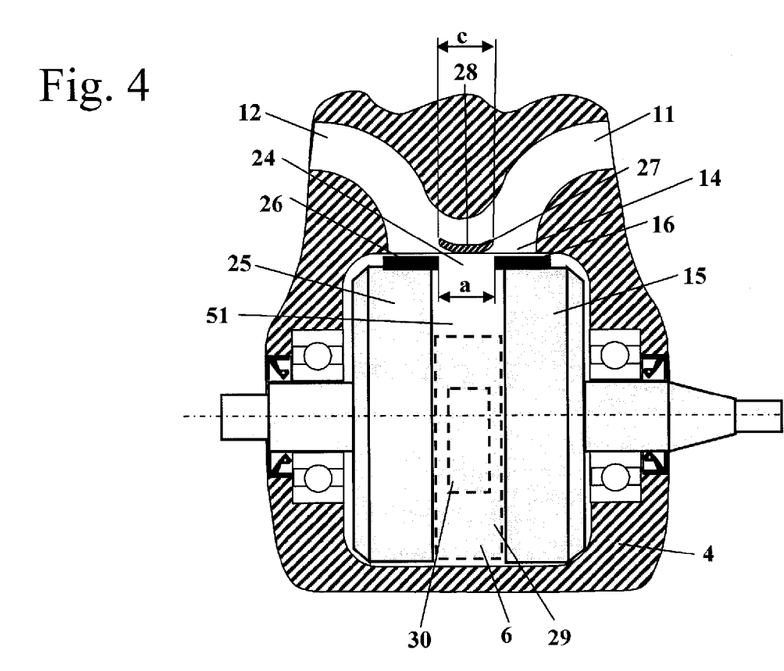
FIG. 4 shows a schematic section along the line in FIG. 1 in the case of an exemplary embodiment of the two-stroke engine from FIG. 1.

FIG. 4 shows an alternate configuration, in which a web or strut 27 is arranged on the crankcase 4 in the middle region 24. The configuration of FIG. 4 corresponds to the configuration of FIG. 3 except for the strut 27. At its end facing toward the transfer channels (11, 12), the strut 27 has a reflection contour 28 which is configured to be concave and which redirects incoming exhaust gases back to the combustion chamber 3. The strut 27 has a width (c) which is measured parallel to the rotational axis 17 and which corresponds approximately to the distance (a) of the control elements 16 and 26. The strut 27 is also configured to be bent at its side facing toward the interior space of the crankcase so that a distance is formed between the strut 27 and the control elements 16 and 26. A passover of small quantities of exhaust gas into the transfer channels 11 and 12 and a prestorage of exhaust gases in the transfer channels 11 and 12 is thus possible. It can also be provided for the strut 27 to be arranged in a manner overlapping the control elements 16 and 26.

Figure 5:
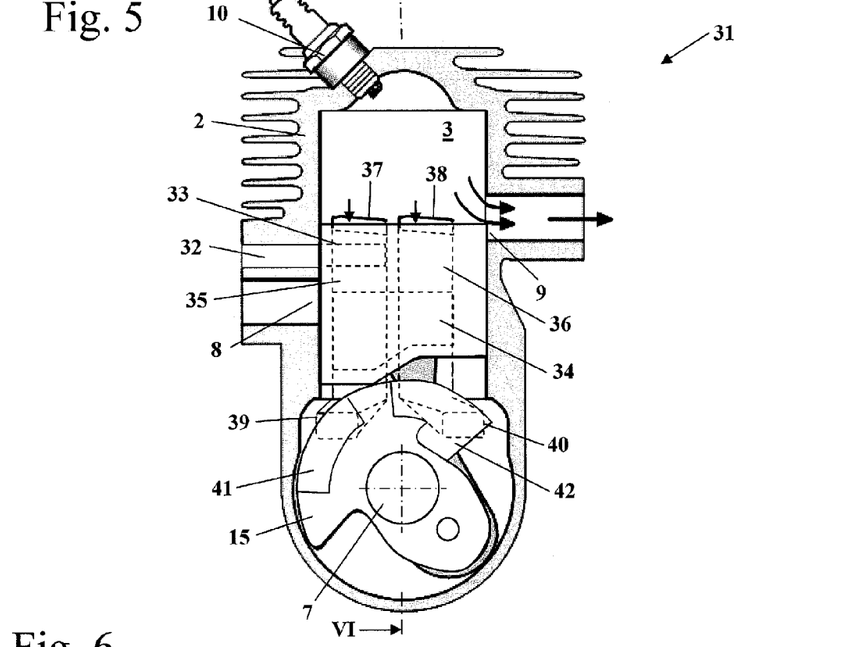
FIG. 5 shows a schematic longitudinal section through a further exemplary embodiment of a two-stroke engine.
Figure 6:
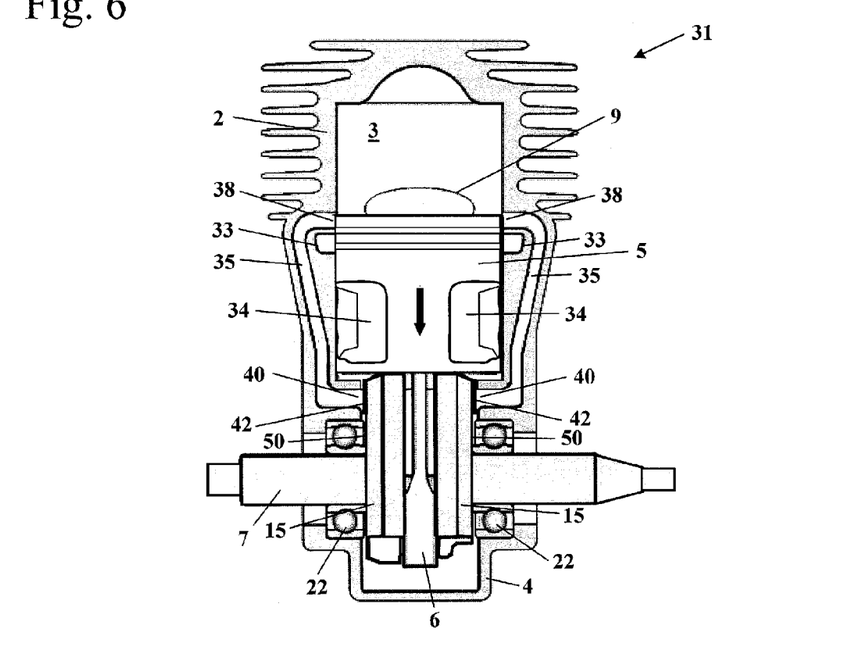
FIG. 6 shows a section along the line VI-VI in FIG. 5.

FIGS. 5 and 6 show an exemplary embodiment of a two-stroke engine 31 which operates with advanced scavenging. The same reference numerals as in the previous figures identify corresponding components. In addition to the inlet 8 and the outlet 9, an air channel 32 having an air inlet 33 on the cylinder bore opens on the cylinder 2 of the two-stroke engine 31. In FIG. 5, a transfer channel 36 near the outlet and a transfer channel 35 remote from the outlet are shown. Two transfer channels 35 near the outlet and two transfer channels 36 remote from the outlet are arranged symmetrically to the section plane shown in FIG. 5 so that a total of four transfer channels (35, 36) are provided. The piston 5 has on its outer periphery a piston pocket 34 which, in the region of top dead center of the piston 5, connects the transfer windows 37 and 38 of the transfer channels 35 and 36 to the air inlet 33. The transfer channels 35 and 36 open in the crankcase by way of inlet openings 39 and 40. Control elements 41 and 42, which control the inlet openings 39 and 40, are arranged on the crankweb 15.

As FIG. 6 shows, the control elements 41 and 42 are arranged on the end faces 50 of the crankwebs 15 which face away from each other. The inlet openings 40 open next to the end faces 50. The inlet openings 39 not shown in FIG. 6 also open next to the end faces 50. The control elements 41 are likewise arranged on the end faces 50.

Figure 7:
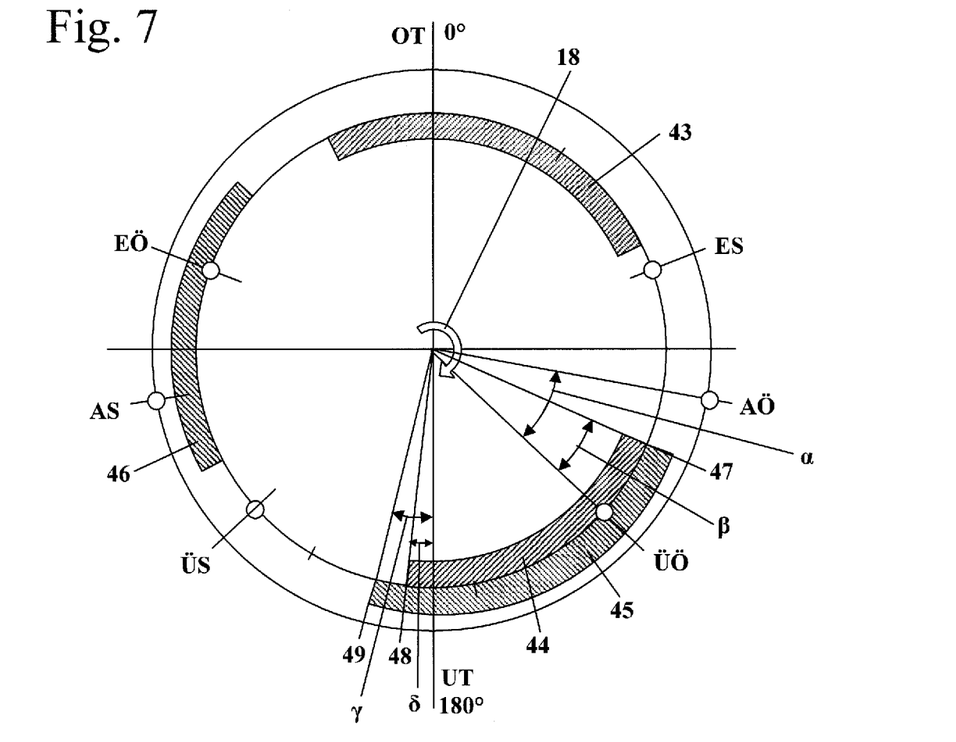
FIG. 7 shows a diagram which shows the control times of the two-stroke engine from FIGS. 5 and 6.

The control times of the two-stroke engine 31 are shown in FIG. 7. The connection of the air inlet 33 and transfer windows 37 and 38 is not shown. During the downward stroke of the piston 5, the inlet 8 closes at the time point ES and the outlet 9 opens at the time point AÖ. Thereafter, there is a first time point 47 at which the control elements 41 and 42 close the inlet openings 39 and 40. This first time point 47 lies at a crankshaft angle (β) ahead of the opening of the transfer windows 37 and 38. The opening of the transfer windows 37 and 38 takes place at a crankshaft angle (α) after the opening of the outlet 9, the crankshaft angle (α) being advantageously less than approximately 30° and especially less than approximately 20°. A hatched region 44 shows the closure time of the inlet opening 39 of the transfer channel 35 remote from the outlet. The transfer channel 35 remote from the outlet remains closed up to a second time point 48 which lies at a crankshaft angle (δ) after bottom dead center. The crankshaft angle (δ) is less than the crankshaft angle (γ) which indicates how many degrees crankshaft angle after bottom dead center the inlet opening 40 of the transfer channel 36 near to the outlet is opened. The crankshaft angles (γ) and (δ) are advantageously at most 30°, especially at most 20° and advantageously at most 10°. The closure time of the inlet opening 40 is indicated by the hatched region 45. The third time point 49, at which the inlet opening 40 is opened, is advantageously at a crankshaft angle of approximately 2° to approximately 10° after the second time point 48 at which the inlet opening 39 is opened.

As FIG. 7 shows, there is additionally provided a first hatched region 43, in which the second control element 42 closes the inlet opening 39, and a fourth hatched region 46, in which the first control element closes the inlet opening 40. Since the transfer windows 37 and 38 are closed during these times, these additional control times have no influence on the operation of the two-stroke engine 31.

The first time point 47 advantageously lies, at the latest, at a crankshaft angle of 5° after the time point ÜÖ. Advantageously, the first time point 47 lies ahead of the time point ÜÖ. The inlet openings (39, 40) are especially completely closed at the time point ÜÖ. The second time point 48 and the third time point 49 lie advantageously, at the earliest, approximately 30°, especially approximately 25°, advantageously 10° ahead of bottom dead center UT of the piston 5. The time points 48 and 49 especially lie after bottom dead center UT. The time points 48 and 49 lie advantageously at most 30° after bottom dead center UT. The time points 48 and 49 especially lie at most 20°, advantageously at most 10° after bottom dead center UT.

The constructive configurations shown in FIGS. 1 and 3 to 6 are largely independent of the control times shown in FIGS. 2 and 7. The two-stroke engine 1 shown in FIG. 1 can also be operated with the control times shown in FIG. 7 and defined by the regions 44 and 45, and the two-stroke engine 31 shown in FIGS. 5 and 6 can also be operated with the control times shown in FIG. 2. The closure times, which result additionally for the two-stroke engine 31, are non-critical for the function during the upward stroke of the piston 5 and about top dead center OT. The configuration shown in FIGS. 1, 3 and 4 can also be provided for a two-stroke engine having transfer channels near the outlet and remote from the outlet.

Figures 8, 9, 10:
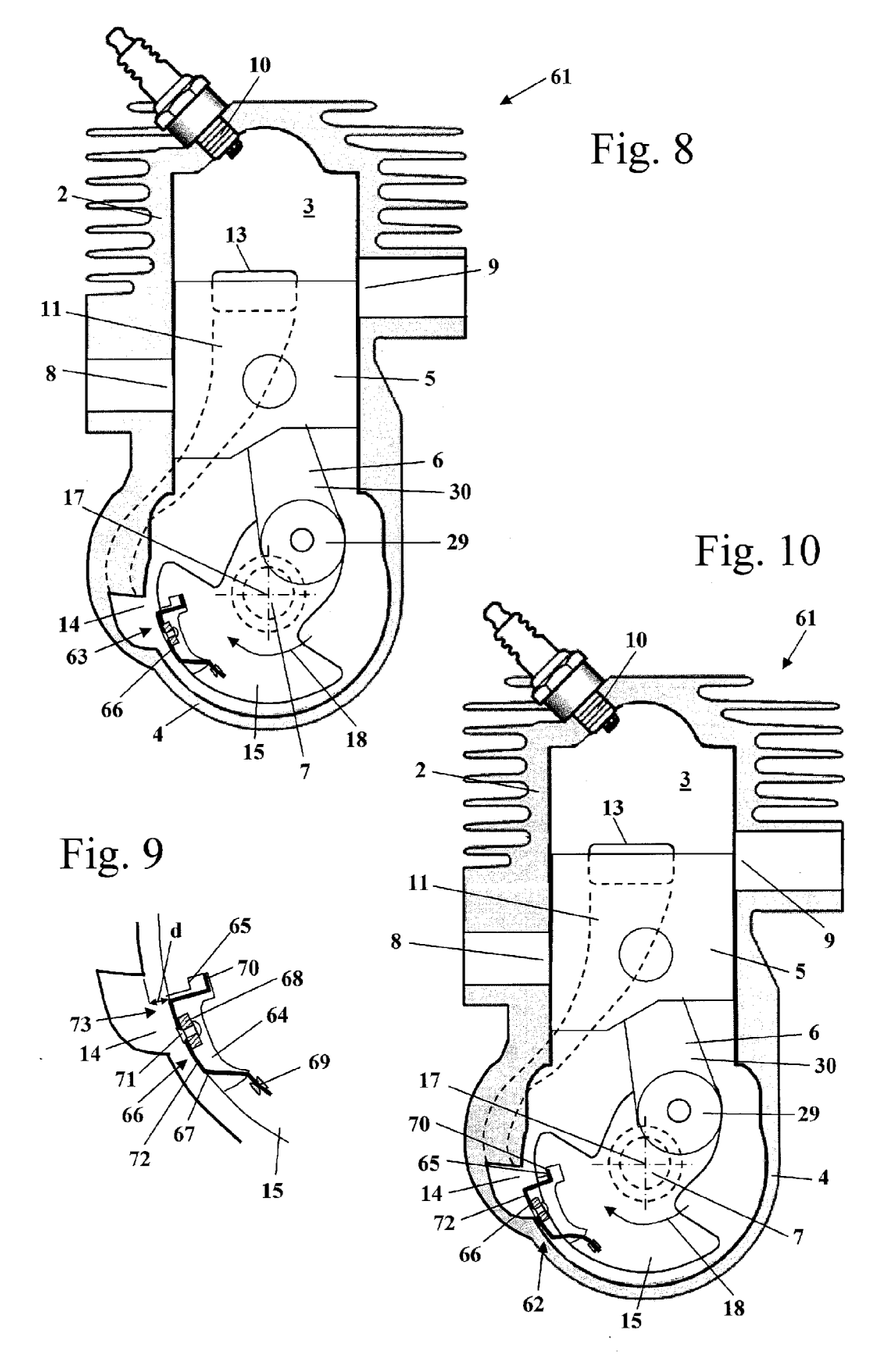

In the constructive embodiments shown in FIGS. 1 and 3 to 6, the control elements (16, 26, 41, 42) are independent of the operating state of the two-stroke engine (1, 31), that is, active, for example, at each engine temperature and at each rotational speed. FIGS. 8 to 10 show a further exemplary embodiment in which the control element 66 is not active in every operating state. The two-stroke engine 61 shown in FIG. 8 corresponds to the two-stroke engine 1, the same reference numerals identifying elements which correspond to each other. A control element which is not active in every operating state can, however, also be provided for the two-stroke engine 31 shown in FIGS. 5 and 6.

In FIG. 8, the two-stroke engine 61 is shown at a rotational speed which lies below a switching rotational speed for the control element 66. The switching rotational speed lies advantageously above the nominal rotational speed of the two-stroke engine 61. For rotational speeds below the switching rotational speed, the control element 66 is arranged in an inactive position 63. In its inactive position 63, the control element 66 does not close the inlet opening 14; instead, the control element is at a clear spacing from the inlet opening 14 in each crankshaft position.

As the enlarged view in FIG. 9 shows, the control element 66 is arranged in a cutout 64 on the outer periphery of the crankweb 15. The control element is configured as spring sheet metal 67 which is held on an attachment 69 at one end of the crankweb 15. On the attachment 69, the control element 66 can, for example, be caulked to the crankweb 15 or be attached via a screw to the crankweb 15. Another type of attachment 69 can also be advantageous. The spring sheet metal 67 has a free end 70 on the end facing away from the attachment 69, the free end interacting with a stop 65 formed on the cutout 64. The spring sheet metal 67 has a control surface 72 which, in the inactive position 63 of the control element 66, is at a distance (d) from the inlet opening 14. As a result, a gap 73 is formed between the inlet opening 14 and the control surface 72, it being possible for the mixture or exhaust gases from the transfer channel 11 to enter into the crankcase 4 via the gap 73. An additional mass 68 is attached to the spring sheet metal 67, for example, via a rivet 71. The additional mass 68 permits good matching to the rotational speed. The additional mass 68 can, however, also be omitted. As a result, the number of individual parts required is reduced; however, switching the rotational speed of the control element 66 is more complicated without the additional mass 68.

FIG. 10 shows the two-stroke engine 61 at a rotational speed above the switching rotational speed. The switching rotational speed can, for example, lie in the region of approximately 11,000 rpm. Because of the centrifugal forces acting in operation, the control element 66 has been pivoted into an active position 62. The spring sheet metal 67 has elastically deformed. In the active position 62, the free end 70 of the spring sheet metal 67 lies against the stop 65. The stop 65 thus defines the position of the spring sheet metal 67 in the active position 62. In the active position 62, the control element 66 lies in the positions of the crankshaft 7 in which the control element 66 at least partially closes the inlet opening 14, directly next to the inlet opening 14. Between the inlet opening 14 and the control surface 72 of the control element 66, only a narrow gap is formed which prevents contact between the control element 66 and the wall of the crankcase 4. The control times at which the control element 66 closes or clears the inlet opening 14 correspond advantageously approximately to the control times shown in FIG. 2 or FIG. 7.

The control element 66 is effective at rotational speeds above the constructively predefined switching rotational speed. Below the switching rotational speed, the inlet opening 14 is not closed by the crankweb 15 or the control element 66. The control element 66 can be slowly displaced from the inactive position 63 into the active position 62 so that the switching rotational speed is a rotational speed band. The control element can, for example, also be configured as a spring biased, linearly-guided slider. A control element can also be displaced from the inactive position into the active position because of other operating parameters, for example, depending on the temperature of the two-stroke engine 61. A control element arranged on an end face of a crankweb 25 can also be provided, it being possible for the control element to be displaced between an inactive position and an active position.

It is understood that the foregoing description is that of the preferred embodiments of the invention and that various changes and modifications may be made thereto, without departing from the spirit and scope of the invention as defined in the appended claims.

What is claimed is:

1. A two-stroke engine comprising:
a crankcase;
a cylinder connected to said crankcase;
a piston disposed in said cylinder so as to reciprocate back and forth therein;
said piston delimiting a combustion chamber in said cylinder;
said cylinder having an outlet leading from said combustion chamber;
at least one transfer channel having an inlet opening whereat said transfer channel opens into said crankcase and a transfer window whereat said transfer channel opens into said combustion chamber with said transfer window being opened and closed by said piston during operation of said engine;
a crankshaft rotatably journalled in said crankcase;
a connecting rod connecting said piston to said crankshaft so as to permit said piston to drive said crankshaft via said connecting rod;
a control element for closing and opening said inlet opening and said control element being connected to said crankshaft so as to rotate therewith;
said control element being mounted on said crankshaft so as to cause said inlet opening to be at least partially closed thereby at the latest at 5° crankshaft angle after opening of said transfer window during a downward stroke of said piston in at least one operating state of said engine; and,
said control element being displaceable between an inactive position wherein said control element is spaced at a clear distance from said inlet opening in every position of said crankshaft so as not to close said inlet opening and an active position wherein said control element either closes or clears said inlet opening in dependence upon the position of said crankshaft.

2. The two-stroke engine of claim 1, wherein said crankshaft has a crankweb defining an end face; and, said control element is mounted at least partially on said end face.

3. The two-stroke engine of claim 1, wherein said crankshaft defines a periphery; and, said control element is mounted at least partially on said periphery of said crankshaft.

4. The two-stroke engine of claim 3, wherein said crankshaft has two crankwebs having respective peripheries; said inlet opening extends along said peripheries of said crankwebs; said crankcase has a peripheral region; said inlet opening defines a middle region arranged in said peripheral region of said crankcase; and, said middle region delimits a movement region for said connecting rod and is arranged between the two regions arranged on the peripheries of the respective crankwebs.

5. The two-stroke engine of claim 4, wherein said crankwebs of said crankshaft are mutually adjacent crankwebs conjointly defining a space therebetween; said connecting rod is arranged in said space; said control element is a first control element; and, wherein said two-stroke engine further comprises a second control element and said first and second control elements are mounted on corresponding ones of said crankwebs.

6. The two-stroke engine of claim 5, further comprising a strut arranged on said crankcase and mounted next to said movement region of said connecting rod and mounted next to said middle region of said inlet opening so as to partially cover said inlet opening.

7. The two-stroke engine of claim 6, said strut having a reflecting contour having a side facing toward said transfer channel and said side being configured to be concave; and, said reflecting contour being configured to reflect a pressure wave caused by exhaust gas in said transfer chanel so as to prevent said pressure wave from propagating into said crankcase.

8. The two-stroke engine of claim 1, wherein said control element is displaced between said active position and said inactive position in dependence upon the rotational speed of said engine.

9. A method for operating a two-stroke engine wherein said engine includes: a crankcase; a cylinder connected to said crankcase; a piston disposed in said cylinder so as to reciprocate back and forth therein; said piston delimiting a combustion chamber in said cylinder; said cylinder having an outlet leading from said combustion chamber; at least one transfer channel having an inlet opening whereat said transfer channel opens into said crankcase and a transfer window whereat said transfer channel opens into said combustion chamber with said transfer window being opened and closed by said piston during operation of said engine; a crankshaft rotatably journalled in said crankcase; a connecting rod connecting said piston to said crankshaft so as to permit said piston to drive said crankshaft via said connecting rod; and, a control element for closing and opening said inlet opening and said control element being connected to said crankshaft so as to rotate therewith; said control element being in an inactive position below a switching rotational speed and whereat said control element is spaced at a clear distance from said inlet opening in every position of said crankshaft so as not to close said inlet opening and said control element being displaceable into an active position above said switching rotational speed whereat said control element either closes or clears said inlet opening in dependence upon the position of said crankshafts; and, said method comprising the step of: causing said control element, in said active position thereof, to close said inlet opening at the latest at 5° crankshaft angle in advance of the opening of said transfer window during a downward stroke of said piston.

10. A method for operating a two-stroke engine wherein said engine includes: a crankcase; a cylinder connected to said crankcase; a piston disposed in said cylinder so as to reciprocate back and forth therein; said piston delimiting a combustion chamber in said cylinder; said cylinder having an outlet leading from said combustion chamber; at least one transfer channel having an inlet opening whereat said transfer channel opens into said crankcase and a transfer window whereat said transfer channel opens into said combustion chamber with said transfer window being opened and closed by said piston during operation of said engine; a crankshaft rotatably journalled in said crankcase; a connecting rod connecting said piston to said crankshaft so as to permit said piston to drive said crankshaft via said connecting rod; and, a control element for closing and opening said inlet opening and said control element being connected to said crankshaft so as to rotate therewith; said control element being in an inactive position below a switching rotational speed and whereat said control element is spaced at a clear distance from said inlet opening in every position of said crankshaft so as not close said inlet opening and said control element being displaceable into an active position above said switching rotational speed whereat said control element either closes or clears said inlet opening in dependence upon the position of said crankshaft and, said method comprising the step of: causing said control element, in said active position, to close said inlet opening at the latest at 5° crankshaft angle after said transfer window starts to open during a downward stroke of said piston.

11. The method of claim 10, wherein said inlet opening has a flow cross section and said control element, in said active position thereof, closes said inlet opening over all of said flow cross section.

12. The method of claim 10, wherein said inlet opening is completely open at the earliest at 30° crankshaft angle ahead of bottom dead center in said active position of said control element.

13. The method of claim 12, wherein said inlet opening is completely open after bottom dead center of said piston in said active position of said control element.

14. The method of claim 10, wherein said inlet opening is completely open at the latest at 30° past bottom dead center of said piston in said active position of said control element.

15. The method of claim 10, wherein said transfer channel is an outlet-near transfer channel; and, said two-stroke engine further comprises an outlet-remote transfer channel; and, wherein the inlet opening of said outlet-near transfer channel is opened after the inlet opening of said outlet-remote transfer channel in said active position of said control element.

16. The method of claim 10, wherein said transfer window is opened less than 30° crankshaft angle after the opening of said outlet in said active position of said control element.

* * * * *

UNITED STATES PATENT AND TRADEMARK OFFICE
CERTIFICATE OF CORRECTION

PATENT NO.        : 8,967,101 B2
APPLICATION NO.   : 13/603635
DATED             : March 3, 2015
INVENTOR(S)       : C. Barth et al.

Page 1 of 1

It is certified that error appears in the above-identified patent and that said Letters Patent is hereby corrected as shown below:

In the specification

In column 4:
Line 38: insert -- III-III -- after "line".
Line 39: insert -- III-III -- after "line".

In column 5:
Line 43: delete "($\gamma$)" and substitute -- ($\alpha$) -- therefor.

In the claims

In column 10:
Line 63, Claim 9: delete "crankshafts" and substitute -- crankshaft -- therefor.

In column 11:
Line 22, Claim 10: insert -- to -- after "not".

Signed and Sealed this
Fifteenth Day of December, 2015

Michelle K. Lee
*Director of the United States Patent and Trademark Office*